Oct. 9, 1945.  T. J. WATSON ET AL  2,386,520
FILING SYSTEM
Filed March 11, 1943  11 Sheets-Sheet 1

INVENTORS
Thomas J. Watson
Burdette H. Phillips
BY
W. M. Wilson
ATTORNEY.

Oct. 9, 1945. T. J. WATSON ET AL 2,386,520
FILING SYSTEM
Filed March 11, 1943 — 11 Sheets-Sheet 2

INVENTORS
Thomas J. Watson
Burdette H. Phillips
BY
W. M. Wilson
ATTORNEY.

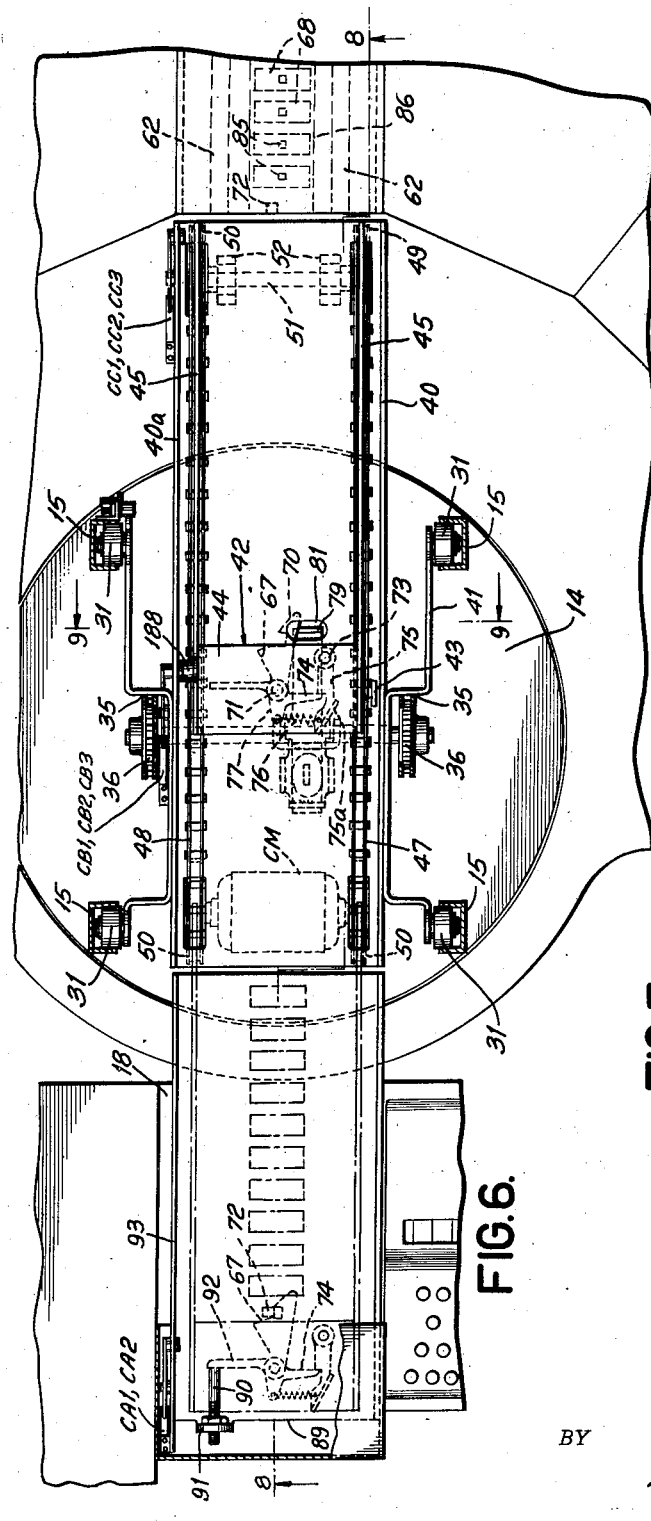

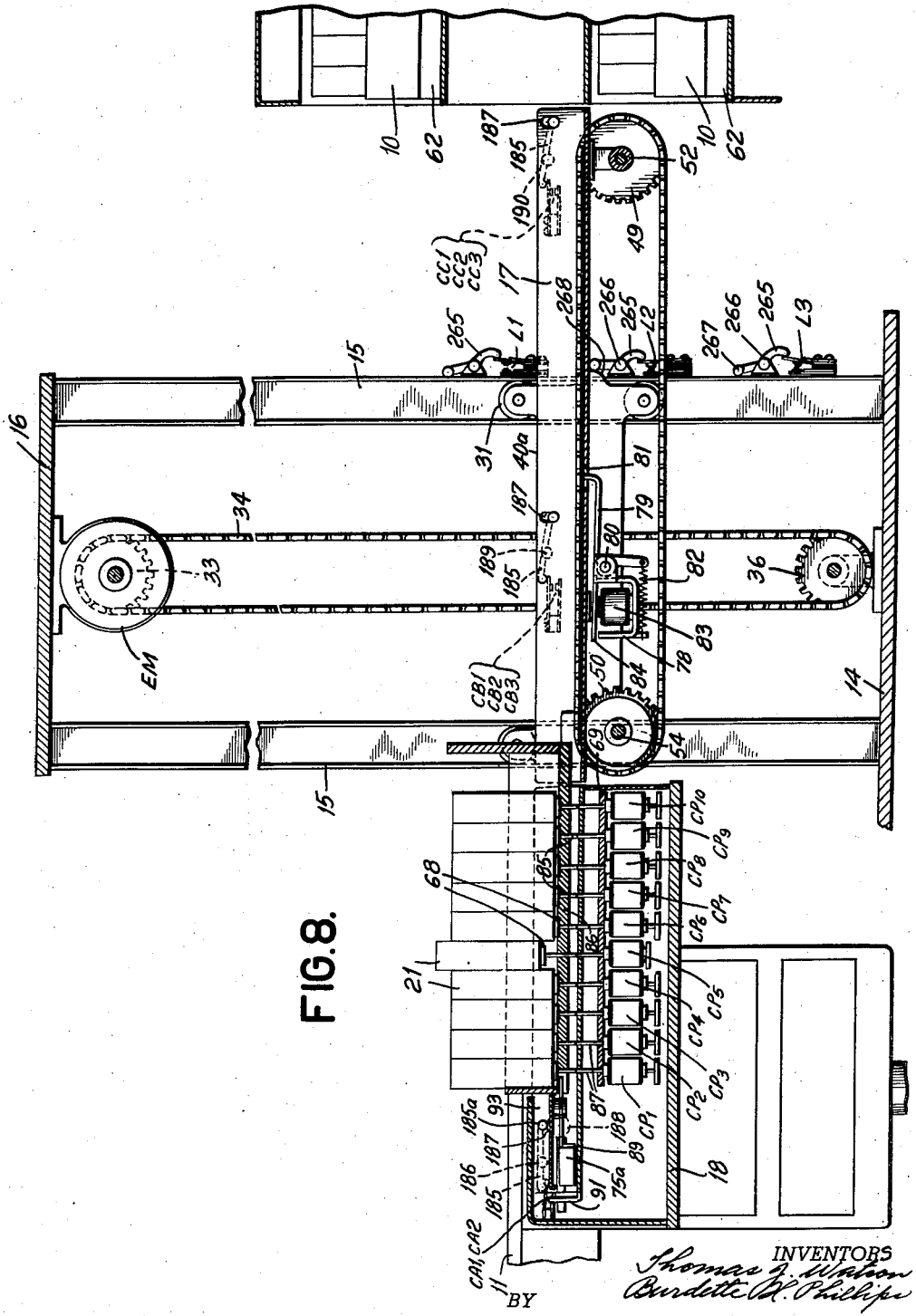

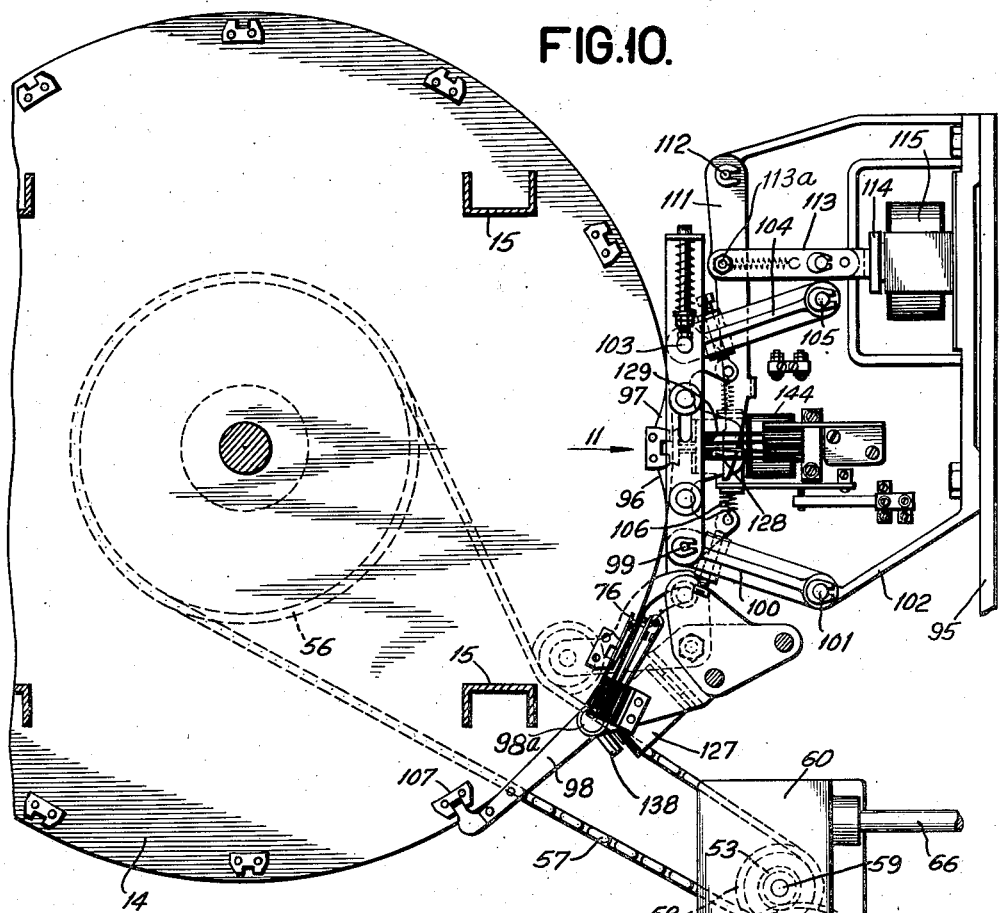
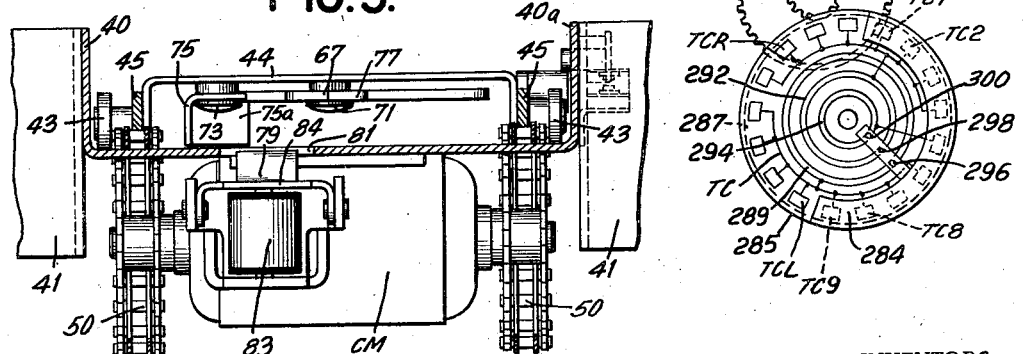

Oct. 9, 1945.  T. J. WATSON ET AL  2,386,520
FILING SYSTEM
Filed March 11, 1943    11 Sheets-Sheet 6
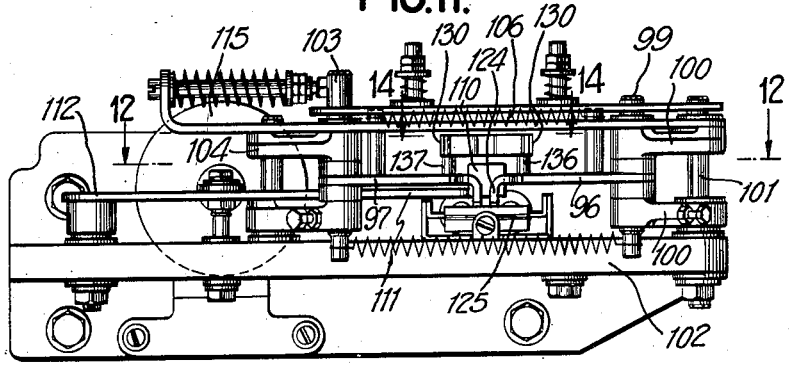
FIG. 11.
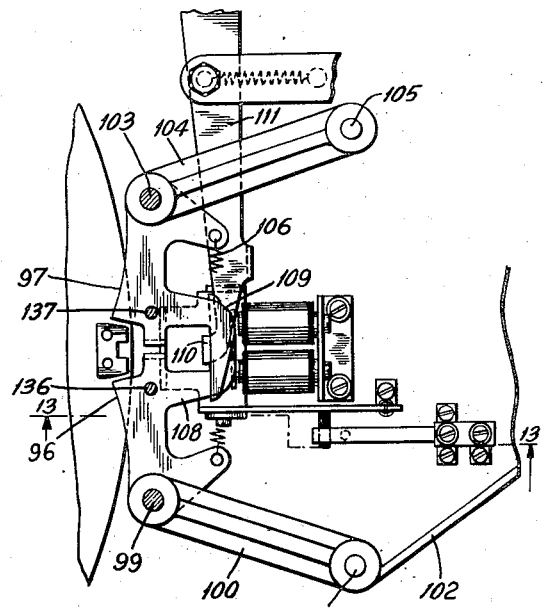
FIG. 12.
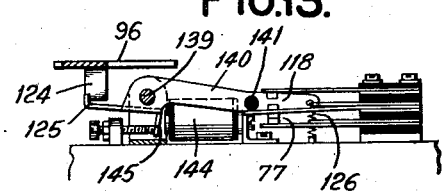
FIG. 14.
FIG. 13.
INVENTORS
THOMAS J. WATSON
BURDETTE H. PHILLIPS
BY
ATTORNEY Oct. 9, 1945.   T. J. WATSON ET AL   2,386,520
FILING SYSTEM
Filed March 11, 1943   11 Sheets-Sheet 7

INVENTORS
Thomas J. Watson
Burdette H. Phillips
BY
W. M. Nelson
ATTORNEY.

Oct. 9, 1945. T. J. WATSON ET AL 2,386,520
FILING SYSTEM
Filed March 11, 1943 11 Sheets-Sheet 8
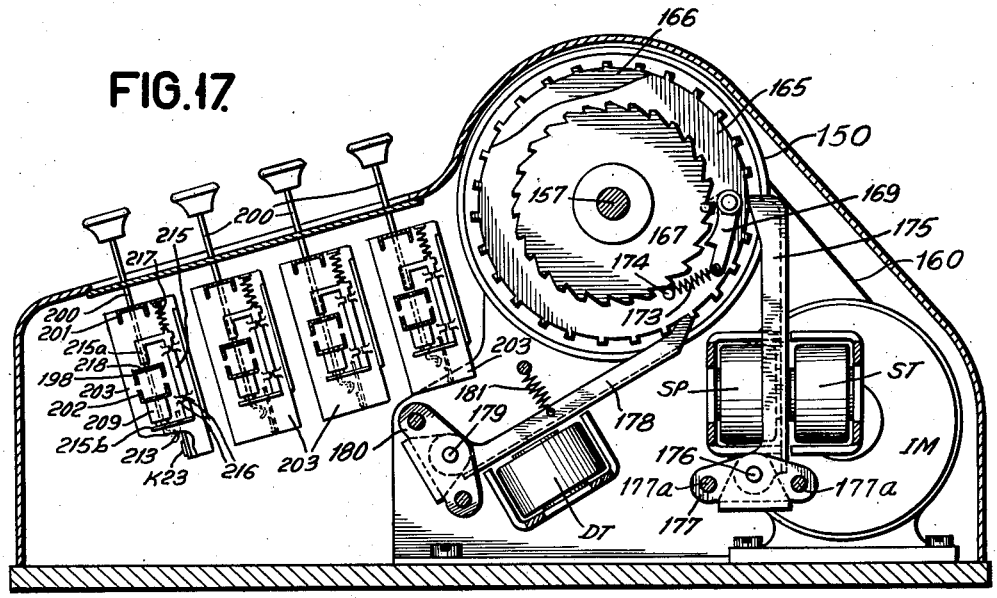
FIG. 17.
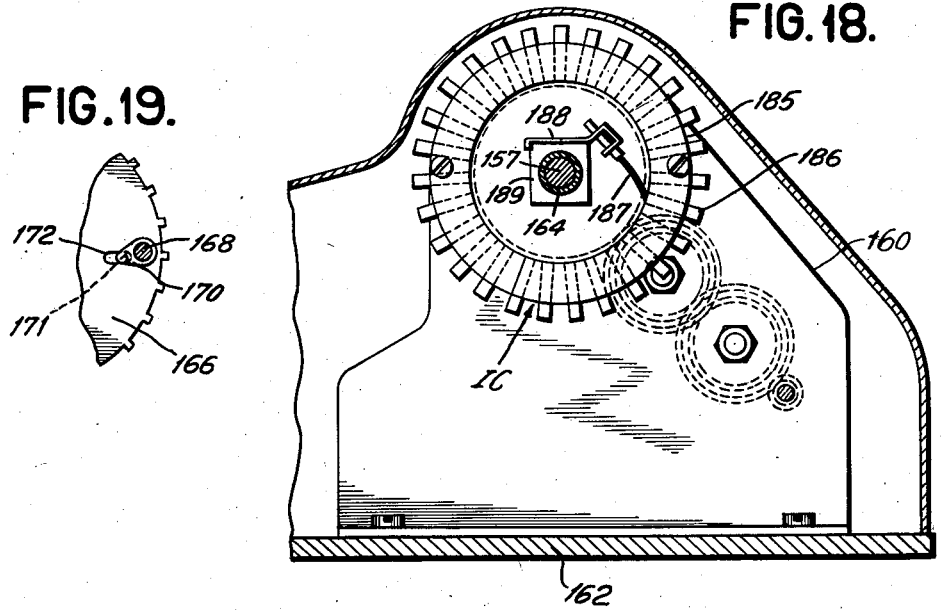
FIG. 19.
FIG. 18.
INVENTORS
Thomas J. Watson
Burdette H. Phillips
BY
W. M. Wilson
ATTORNEY.

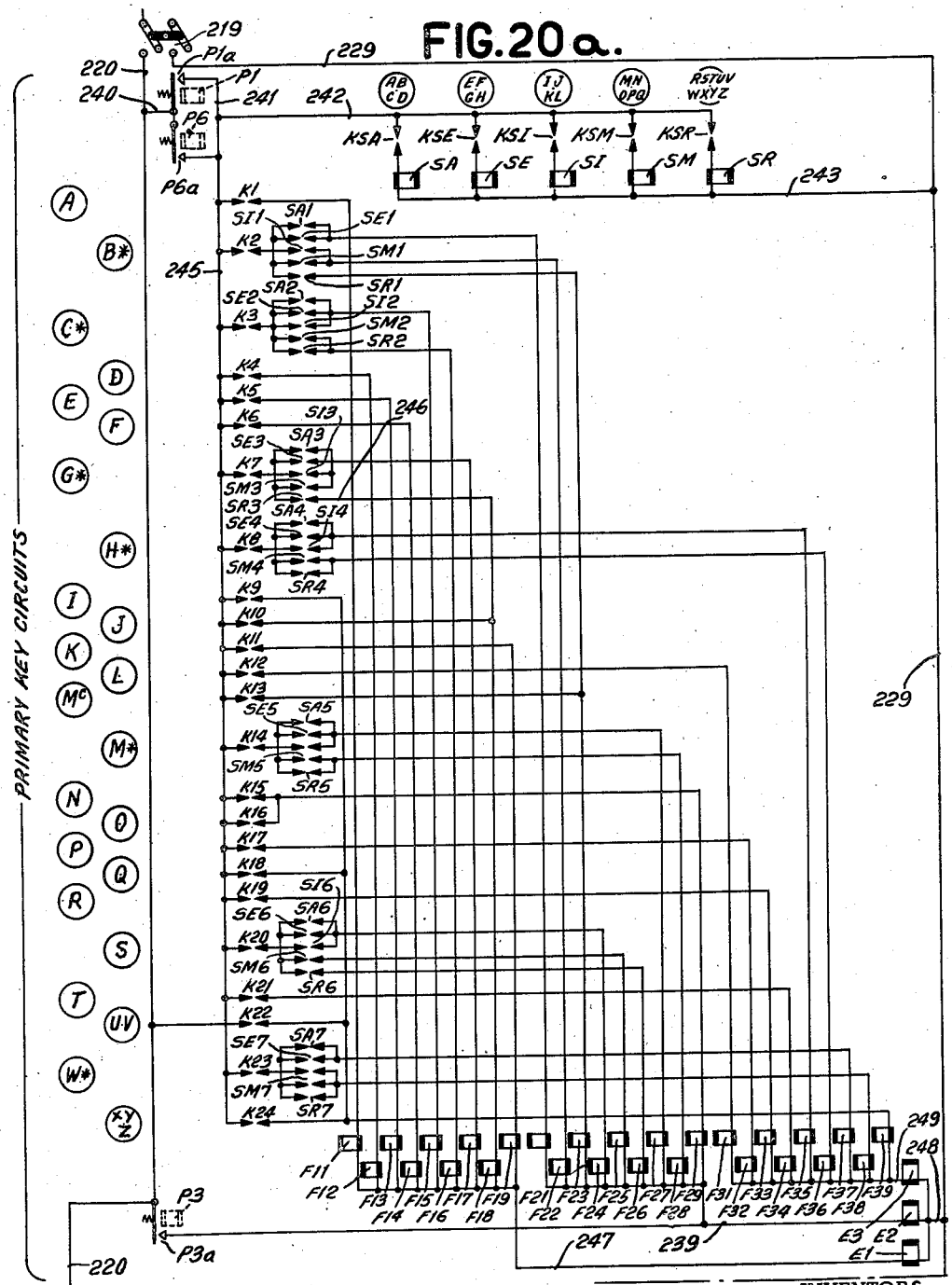

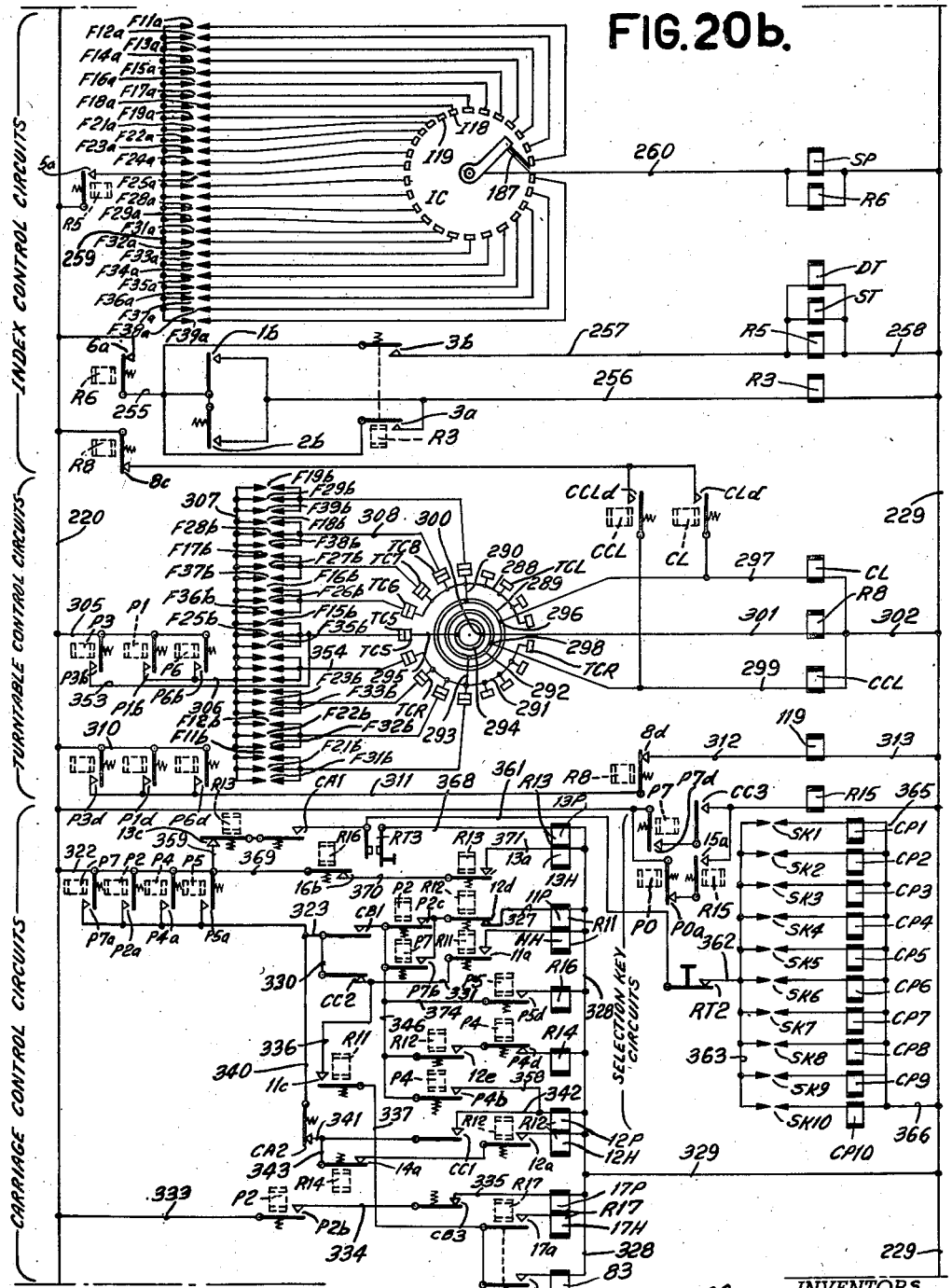

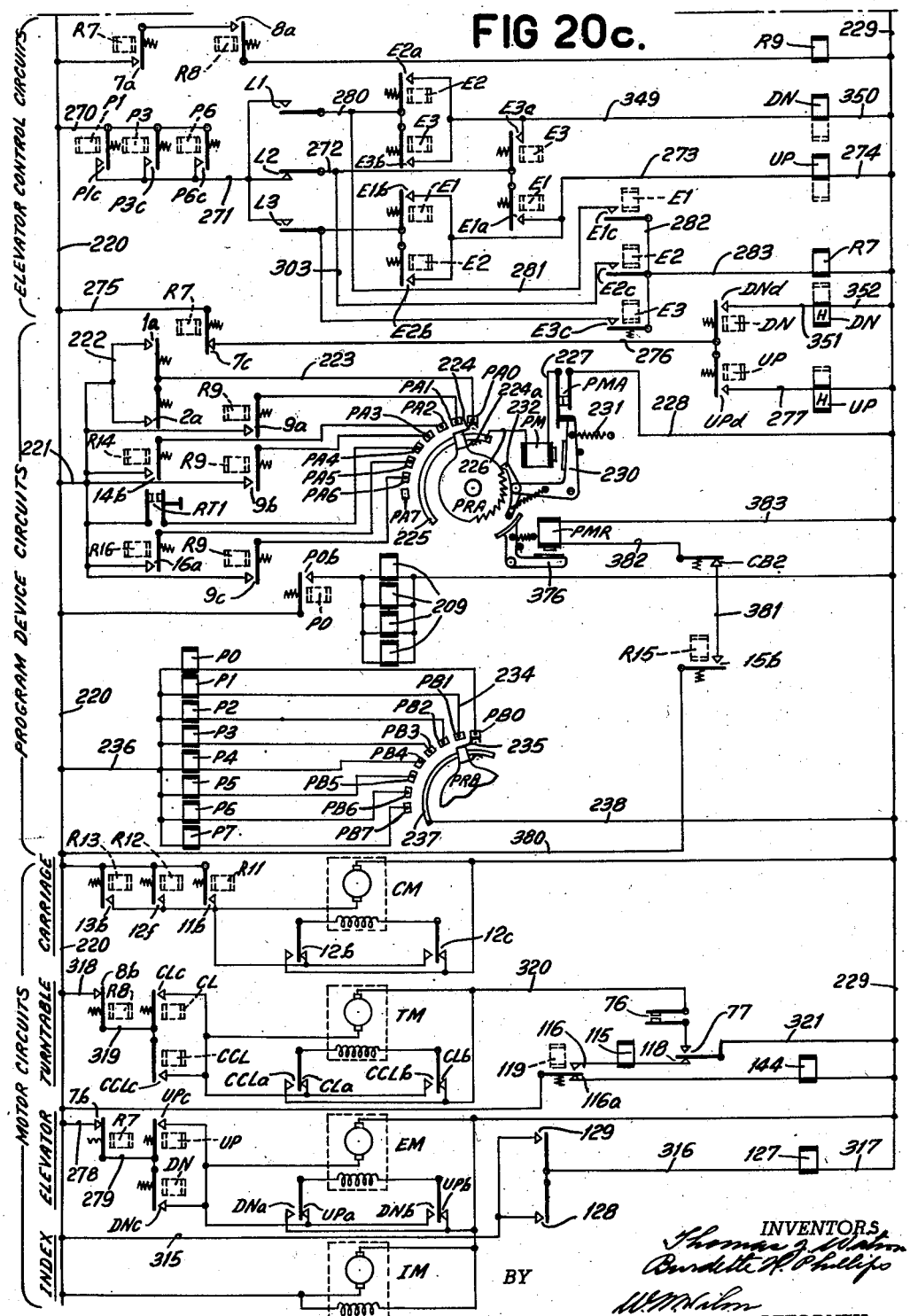

Patented Oct. 9, 1945

2,386,520

UNITED STATES PATENT OFFICE 2,386,520

FILING SYSTEM

Thomas J. Watson, New Canaan, Conn., and Burdette H. Phillips, Endicott, N. Y., assignors to International Business Machines Corporation, New York, N. Y., a corporation of New York Application March 11, 1943, Serial No. 478,808

7 Claims. (Cl. 45—2)

This invention relates to a filing system, whereby an operator sitting at a desk, by manipulating appropriate control means, such as a keyboard, can cause a designated unit of material automatically to be selected and withdrawn from a storage space, transported to the desk for examination, and then returned to its place in the storage space.

One object of the invention is to provide an automatic filing system controlled by a keyboard at the operator's station, comprising means to remove from a storage space a designated unit of material, to convey it to the operator's station for examination; then, upon depression of a single "Return" key, to restore the material to its original position in the storage space.

It is a further object of the invention to provide an automatic filing system of the kind described, so constituted that a file clerk can be engaged in the insertion and withdrawal of material from any section of the storage space, except a particular section from which the operator has withdrawn material for examination.

Another object is to provide a filing system of the kind described, wherein the material is moved to and from the operator's station by conveying means which remain at that part of the storage space where material was last returned, until a new operation is started, then move directly to the part of the storage space containing the newly designated material.

Still another object is to provide a filing system having conveying means as last described, capable of moving transversely and vertically at the same time, in order to travel from one section of the storage space to another rapidly. For this purpose, the storage space preferably comprises a plurality of columns of sections and the conveying means is movable vertically, horizontally, diagonally, or diagonally and vertically or horizontally, to approximate the most direct route from one section of the storage space to another.

Another object is to provide an automatic filing system of the kind described, controlled by a keyboard permitting primary selection according to one letter, and in certain cases, supplementary selection according to one or more additional letters. The keyboard may be constructed so that the primary selection keys pertaining to certain letters control the selection directly, while others require the operation of supplementary keys to complete the selection. The primary selection keys may represent the first letter of a name, for example, and the supplementary selection keys an additional letter.

In a preferred form of the invention, a primary selection and a secondary selection are both set up by the operator on a keyboard, the primary selection resulting in the conveyance of a section or drawer of the storage cabinet to the operator's station, the section containing a plurality of compartments or boxes from which a secondary selection is made upon arrival of the drawer at the operator's desk, under control of the secondary selecting means previously set on the keyboard. To facilitate the realization of the object last described, the system may comprise an index mechanism which is set in operation simultaneously with the conveyor, and which brings to the operator's view, indicia for indicating how the secondary selection should be set up for the particular drawer of the cabinet selected, the last procedure taking place prior to the arrival of the drawer at the operator's station, so that the secondary selection is made automatically upon arrival of the drawer at the operator's station.

In accordance with another feature of the preferred embodiment, the storage space comprises a semicircular arrangement of columns of storage sections or drawers, and the conveying means comprises an elevator mounted on a turntable, so that it can be turned to any column of the storage space and raised or lowered to any level, to place it in position to withdraw one of drawers of the storage space onto the elevator. The elevator is then moved to a central position wherein the drawer can be transferred to the operator's station or desk. Upon arrival at the desk, a secondary selecting means raises a particular compartment above the level of the other compartments in the drawer, where it can be removed by the operator and its contents examined. When the examination is completed, the compartment is returned to its place in the drawer and the "Return" key is depressed. Thereupon, the conveying means reverses its previous movements and restores the drawer to its particular place in the storage cabinet.

Other objects of the invention will be pointed out in the following description and claims and illustrated in the accompanying drawings, which disclose, by way of example, the principle of the invention and the best mode, which has been contemplated, of applying that principle.

In the drawings:

Fig. 6 is a horizontal section on the line 6—6 of Fig. 3, on a larger scale.

Fig. 7 is a diagram of the file drawer arrangement.

Fig. 8 is a vertical section on the line 8—8 of Fig. 6, but with the compartments at the left in side elevation.

Fig. 9 is an enlarged transverse section on the line 9—9 of Fig. 6.

Fig. 10 is a horizontal section of the elevator, showing the turntable and its operating and control mechanism in plan view.

Fig. 11 is a detail elevation of the turntable locking mechanism, in the direction of the arrow in Fig. 10.

Fig. 12 is a horizontal section on the line 12—12 of Fig. 11.

Fig. 13 is a section on the line 13—13 of Fig. 12.

Fig. 14 is a detail sectional view of a contact mechanism, on the line 14—14 of Fig. 11.

Fig. 17 is a vertical section on the line 17—17 of Fig. 15, showing the index clutch mechanism.

Fig. 18 is a vertical section on the line 18—18 of Fig. 15, showing the index commutator.

Fig. 19 is a fragmentary sectional view of part of the index clutch mechanism.

Figs. 20a–20c together constitute the circuit diagram.

Figure 1:
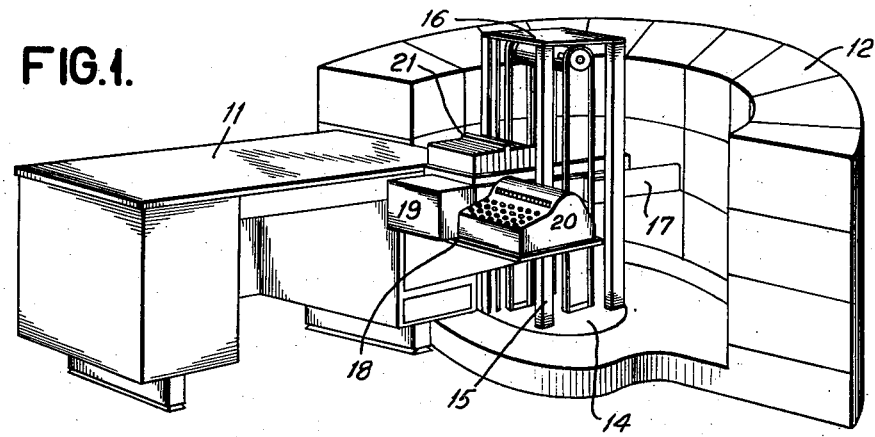
Fig. 1 is a perspective view of the complete filing system in bold outline.
Figure 2:
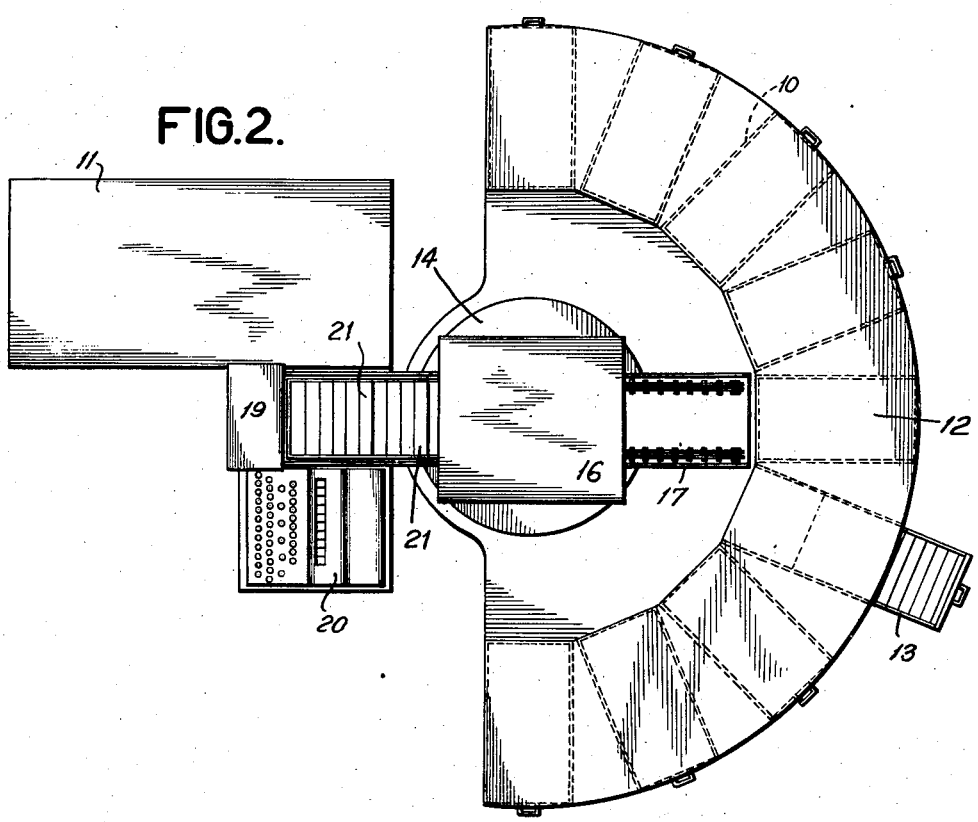
Fig. 2 is a plan view of the same.
Figure 3:
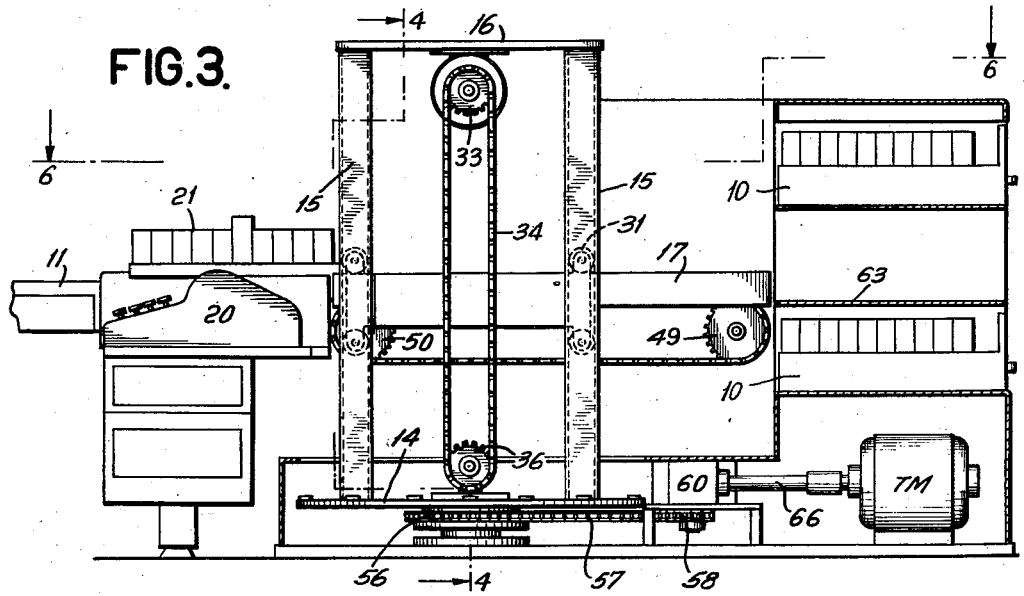
Fig. 3 is a vertical section of the filing system, showing parts in side elevation.
Figure 4:
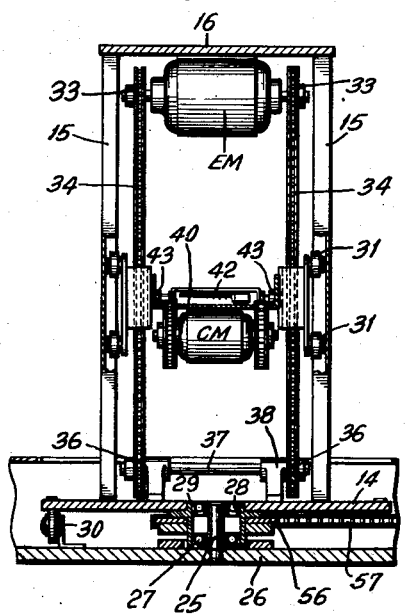
Fig. 4 is a vertical section on the line 4—4 of Fig. 3.

Referring to the general views, Figs. 1–3, there is situated adjacent the operator's desk 11, a semicircular filing cabinet 12 comprising nine columns of drawer sections, each three drawers high. The drawers 10 are arranged to slide radially in the cabinet, either outward, as shown at 13 in Fig. 2, for attention by the file clerk; or inward, for transportation to the operator's desk. At the center of the cabinet, there is a turn table 14 upon which is mounted an elevator comprising a framework of corner posts 15 joined by a top plate 16, and a vertically movable car 17. The car can be moved to any one of the three levels at which the cabinet drawers are positioned, and the entire elevator can be rotated by the driving mechanism of the turn table 14, to bring the car into any one of nine radial positions proximate, respectively, to the nine columns of drawers of the cabinet. When the car is at the intermediate level and the central radial position, a drawer can be transferred from the car to a shelf 18 at the operator's desk. Here the drawer is positioned adjacent a rest 19 and between the desk top and a keyboard and index mechanism 20 situated on the outer end of the shelf 18. Each drawer contains a number of compartments 21, ten compartments being shown in the present case.

The system includes control means, to be described later, whereby, with all the drawers in the cabinet, and the elevator car standing at any one of its twenty-seven possible positions, where it was left after return of a drawer to the cabinet at the end of the preceding file examining operation, a sequence will be automatically carried out, under control of the keyboard 20, comprising the following operations:

1. The turn table will be rotated and the elevator car moved vertically, to bring it into register with the newly designated section or drawer of the cabinet. If either one, or both, of these movements is unnecessary, because of the relation of the newly selected drawer to the one previously returned, a horizontal or vertical movement will take place alone; or the next step of the sequence will begin immediately.

2. The drawer will be transferred from the cabinet to the elevator car.

3. The elevator car will be moved either vertically or horizontally, or both, to the middle position. If it is the middle drawer that has been selected, the fourth step of the sequence will follow immediately after the second step.

4. The drawer will be transferred from the elevator car to the operator's station.

5. One of the ten compartments or boxes 21 in the drawer will be raised above the others, under control of a previously set secondary selection key of the keyboard.

6. The operator will remove the box, examine its contents, return it to its position in the drawer, and press a "Return" key.

7. The box will be dropped to the level of the other boxes in the drawer and the drawer will be transferred from the operator's station to the elevator car.

8. The elevator car will, if necessary, move vertically and transversely to bring it opposite the chamber of the cabinet from which the drawer was removed.

9. The drawer will be transferred from the elevator car to its chamber in the cabinet.

*The conveying means*

The construction of the conveying means, which comprises the rotatably mounted elevator, with vertically movable car 17, is shown particularly in Figs. 4 to 6 and 8. The turn table 14 pivots on a bearing post 25 (Fig. 4) fixed in the base plate 26, two roller bearings 27 and 28 being interposed between the post 25 and the hub 29 of the turn table. Additional roller supports 30 are provided at suitable intervals under the outer edge of the turntable plate 14. The four corner posts 15 are in the form of channel bars, to provide trackways for sets of rollers 31 journaled on the car 17. The car comprises a central trough 40, to the sides of which are fixed brackets 41 which carry the rollers 31 at their extremities. A reversible elevator motor EM anchored to the top plate 16 has two sprocket wheels 33 at the opposite ends of its shaft, over which are trained two chains 34 fastened at the points 35 to the opposite sides of the car 17. In the lower loops of the chains engage sprocket wheels 36 secured to the ends of a shaft 37 journaled in bearings 38 on the turn table plate 14.

For the purpose of transferring the drawers between the cabinet and the elevator car, and between the latter and the operator's station, there is provided on the elevator car a carriage 42. The carriage comprises a cross plate 44 and two long side bars 45 fixed thereto, and is fitted with wheels 43 to travel upon the trough 40 of the elevator car. The bottom edges of the side bars 45 are toothed, to engage the cross pins of two chains 47 and 48 carried upon sprockets 49 and 50. The sprockets 49 are fixed to the ends of a shaft 51, journaled in bearings 52 on the bottom of the trough 40, while the sprockets 50 are fixed to the ends of the shaft 54 of a reversible carriage motor CM anchored to the bottom of the shaft 40.

Figure 5:
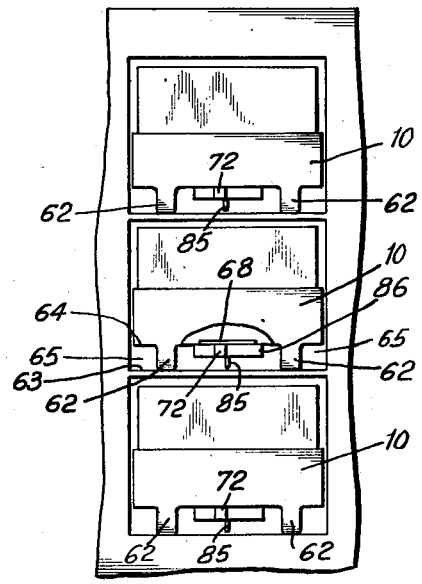
Fig. 5 is a front elevation of a portion of the file cabinet, showing one of the drawers with parts broken away.
Figure 15:
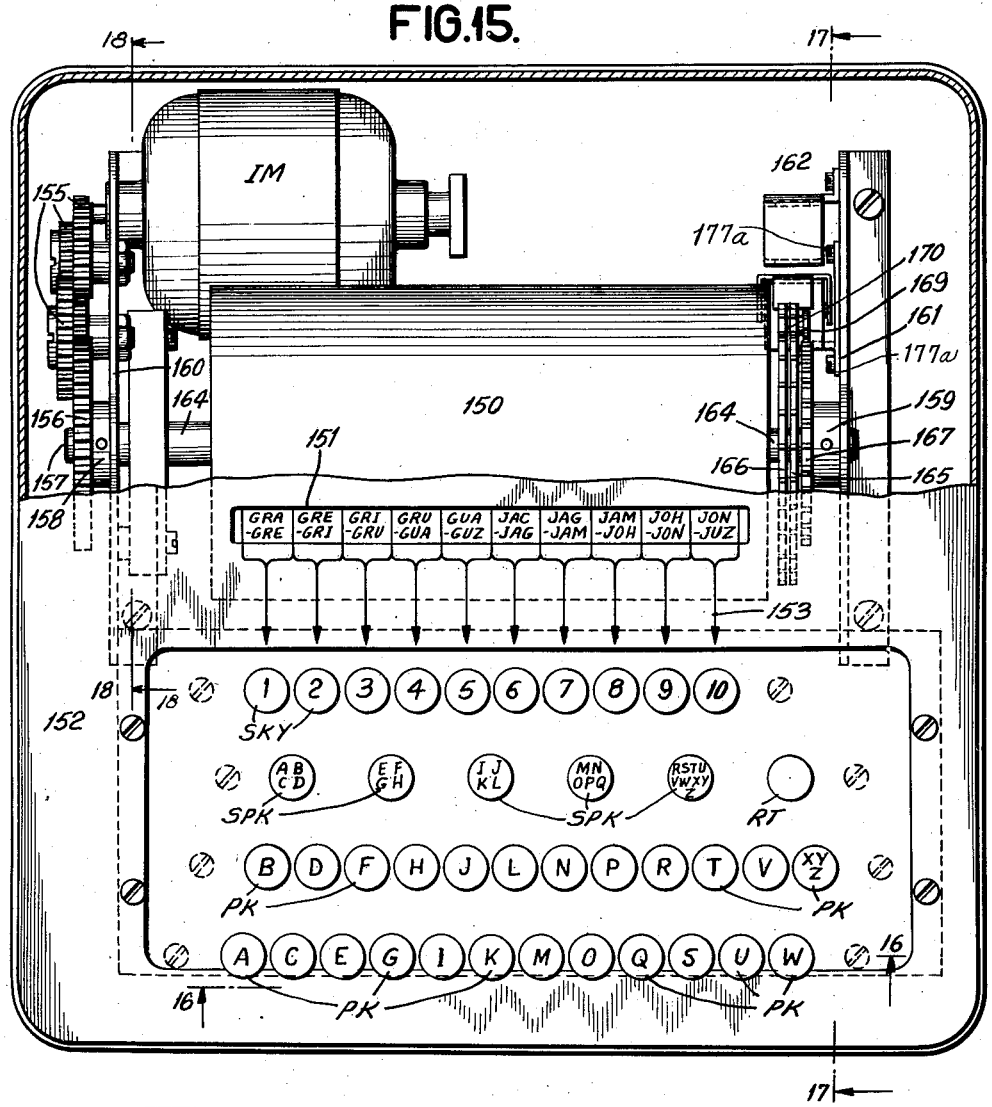
Fig. 15 is a plan view of the keyboard and index mechanism, with a part of the casing removed.
Figure 16:
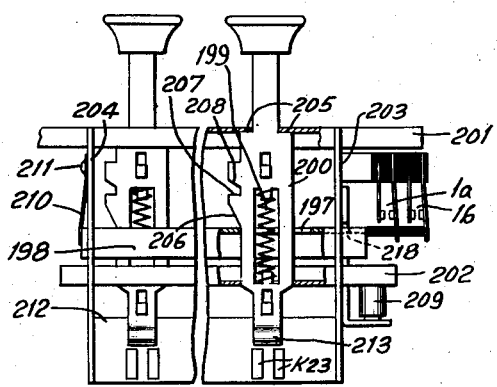
Fig. 16 is a vertical section on the line 16—16 of Fig. 15, showing the keyboard structure.

At certain times in the above mentioned sequence of operations the motor CM is started in one direction to move the carriage over to the file cabinet, where it becomes coupled to one of the drawers; then, by reversing the motor, the carriage is moved to the left, transferring the drawer onto the elevator car. As shown in Fig. 5, each drawer of the cabinet is supported upon the bottom plate 63 of its chamber in the cabinet, by bottom ribs 62 of the drawer. The bottom 64 of the drawer is thus positioned at a sufficient elevation above the plate 63, to provide spaces 65, into which the side bars 45 of the carriage can move, as the carriage approaches the cabinet to engage the drawer, for transfer to the elevator car. On the bottom side of the cross plate 44 of the carriage is a hook 70, pivoted on a pin 71. This hook is adapted to engage and lock with a downwardly extending square pin 72 on the bottom of the drawer. The hook 70 has an arm 74 coacting with a detent 75, pivoted at 73 on the bottom of plate 44, to hold the hook 70, at times, out of the position in which it can engage the pin 72. A spring 76, stretched between another arm 77 of the hook and the detent 75, biases the hook in counterclockwise direction and the detent in clockwise direction. Upon the bottom of the trough 40 is fixed a bracket 78, to which an arm 79 is pivoted by a pin 80. The right end of the arm 79 is bent upward and positioned to move up through a hole 81 in the trough 40 when the arm 79 rocks counterclockwise. The arm is biased in clockwise direction by a spring 82 and is actuated by an electromagnet 83 acting upon an armature plate 84 forming part of the arm 79. In the normal position of the carriage 42 upon the trough 40, the detent 75 is to the left of the upturned end of the arm 79. As the carriage moves to the right toward the cabinet, a downwardly extending flange 75a of the detent 75 engages the upwardly bent end of arm 79, which has been rocked counterclockwise by an excitation of the electromagnet 78 preceding the rightward movement of the carriage, and the detent is thereby rocked to release the arm 74 of the hook 70. The latter swings into the position in which it will engage the pin 72 when the carriage has moved all the way to the right, the hook yielding as it passes the pin 72 and finally snapping behind the pin.

Following the engagement of the hook 70 with the pin 72, the carriage begins its movement to the left, governed by automatic control means to be described later, pulling with it the drawer and transferring the same to the trough of the elevator car. If the drawer happens to be the one at the vertical and transverse center of the storage cabinet, no movement of the elevator or turntable is necessary to position the carriage and drawer for transfer to the desk. If any other drawer has been selected, the necessary movements of the elevator car or turntable, or both, will precede the transfer of the drawer to the desk. Assuming the elevator car to be in the central position shown in the drawings, a further movement of the car to the left pulls the drawer from the trough 40 onto the shelf 18 of the desk, where it stops just behind the rest 19. As the carriage approaches the left end of its movement an adjustable screw 90, mounted on an ear 91 extending up from a frame plate 89, strikes an arm 92 of the hook 70 and rocks the hook clockwise out of engagement with the pin 72. Finger 74 of the hook 70 comes into register with the notch of detent 75 and is engaged thereby, thus releasing the car from pulling connection with the drawer.

Means are provided to make an automatic secondary selection of the individual compartments 21 in the drawer. In the present case the selection of a particular compartment is accomplished by raising the compartment above the others. For this purpose, each drawer is provided with a series of plates 68 (Figs. 5, 6 and 8) having square lifting shafts 85 guided in square vertical holes in a medial rib 86 of the bottom of the drawer. There is a plate 68 for each compartment 21. When the drawer is in its left end position, the shafts 85 are respectively in registration with the armature rods 87 of a set of electromagnets CP1—CP10, mounted on a frame piece 69. The electromagnets can be selectively energized, after the spindles come into register, by means to be described later, so that a particular one of the ten compartments in the drawer is raised above the level of the others, where it can be conveniently grasped by the operator and withdrawn for examination of its contents. When the examination has been finished, the compartment is returned to its place in the drawer, the energized solenoid is deenergized, allowing the compartment to drop back into place, and the drawer is ready to begin its return movement to the storage cabinet. The carriage first moves to the right to its normal position on the elevator car, shown in Fig. 6, the drawer being thrust ahead of it by the arcuate surface 67 of hook 70 bearing against the pin 72. The next stage of movement of the carriage may begin immediately, if the drawer is to be received in the central storage chamber of the cabinet; otherwise, the second step of the return movement of the carriage will await a preparatory movement of the elevator or turntable, or both, to bring the trough 40 in register with the proper receptacle of the cabinet. The carriage then makes a second excursion to the right, returning the drawer to its storage position, and is finally withdrawn to its normal position on the trough. This completes the series of operations constituting one file-examining sequence.

*Turntable operating means*

The turntable operating means is shown particularly in Figs. 3, 4, and 10–14, and is similar to one used to control the movements of another type of rotary device, shown in the Fuller and Brand patent for a sorting machine, No. 2,150,216. The hub 29 of the turntable has secured to it a sprocket 56, with which meshes a drive chain 57 leading to a small sprocket 58 on a shaft 59 of a reducing gear housed in a casing 60. The reducing gear is driven by the shaft 66 of a reversible turntable motor TM. Means are provided to stop the turntable at any one of its nine radial positions corresponding to the nine columns of the file cabinet, and to lock it in the position at which it was stopped. The nine positions are identified in Fig. 10 by nine stop blocks 107, with which cooperate two stop arms 96 and 97 and a lock arm 98 pivoted on a stationary pivot 98a. The stop arm 96 is pivotally supported at 99 by a pair of arms 100 pivoted on a stud 101 projecting from a frame 102 secured to the base 95. The stop arm 97 is similarly supported at 103 by a pair of arms 104 pivoted on a stud 105 on the frame 102. A spring 106 stretched between projections on the arms 96 and 97 normally holds these arms in their effective or protruding positions. Further, details of the construction shown are described in the above mentioned patent to Fuller and Brand.

Before the turntable can be rotated, it is necessary to withdraw the arms 96 and 97 clear of the particular block 107 then between said arms. To this end, the stop arms 96 and 97 are provided with hooked projections 108 and 109, respectively. Extending across these projections is an ear 110 bent over from the free end of a lever 111, pivoted on a stud 112 in the frame 102. A link 113 pivotally connected at 113a to the lever 111 has secured to its right end the armature 114 of a solenoid 115.

Energization of the solenoid 115 attracts its armature 114, drawing the link 113 to the right and rocking the lever 111 counterclockwise. This movement of the lever 111, through the ear 110, rocks the stop arm 96 clockwise and the stop arm 97 counterclockwise, thus moving said stop arms out of the path of the blocks 107. As the stop arms 96 and 97 approach the limit of their movement, a latch 125 (Fig. 13), under the influence of its spring 126, rocks clockwise to engage bent-out ends 124 of latch arms 96 and 97, to lock the arms in ineffective position. The latch 125 is pivoted at 139 and is operated by a solenoid 144 acting upon an armature arm 145 of the latch.

Before the turntable 14 is free to rotate, the lock arm 98 must be removed to ineffective position. This is accomplished by a magnet 127, the circuit of which is controlled by pairs of contacts 128 and 129 (Figs. 10, 11 and 14) having inner blades bent upward at an angle. These angular ends of the inner blades carry blocks 130 of insulating material. Studs 136 and 137, projecting respectively from the stop arms 96 and 97, cooperate with the blocks 130 to hold the pairs of contacts 128 and 129 open when the stop arms are in their effective position. When the stop arms 96 and 97 are pulled back to free the turntable 14, the studs 136 and 137 are carried out of engagement with the blocks 130, whereupon the contacts 128 and 129 are closed by the spring tension of their blades.

Closure of contacts 128, or 129, or both, energizes magnet 127, which attracts its armature 138 and rocks the lock arm 98 clear of the block 107.

The turntable motor TM is now started in the proper direction to move the turntable toward the selected new position. As the block 107 identifying the selected position approaches the position in which it is to be stopped, the electromagnet 144 is energized to retract the hook 125 from the lugs 124 of arms 96 and 97, which thereupon spring into effective position. The block 107 cams down either the arm 96 or 97, depending upon the direction of rotation, and is stopped by the other arm, the circuit of the motor TM having been broken at about this time. When the turntable has come to rest and the contacts 128 and 129 are both open, the circuit of the electromagnet 127 is broken and the locking arm 98 drops into the notch of the block 107 which stands opposite its nose.

*File drawer arrangement*

Fig. 7 shows, in the form of a diagram, an arrangement of the file drawers suitable for filing correspondence and based upon a well known table of relative frequency of occurrence of letters in alphabetic sorting. It has been found that proper names beginning with certain letters occur much more frequently than those beginning with certain other letters. For example, in each thousand names there will usually be one hundred names beginning with a B and one hundred and five beginning with an S, while there will be only four names beginning with an I, two beginning with a Q, and not even one beginning with an X. The other letters range in between these extremes. The most efficient utilization of a filing space sub-divided into twenty-seven drawers, as in the cabinet shown in the drawings, consequently calls for a distribution of names beginning with frequently occurring initial letters, such as S and B, into several drawers, and the grouping together of names beginning with the less frequently occurring initial letters, such as I, Q, U, V, X, Y and Z. In subdividing the group of names beginning with one letter, it is convenient to base the subdivision upon the second letter of the name. For the purpose of this grouping according to the second letter, the present illustrative embodiment shows a division of the alphabet into five parts, comprising, respectively, the letters A-D, E-H, I-L, M-Q, and R-Z.

The diagram shown in Fig. 7 is self-explanatory as to the subdivision and grouping of the initial and second letters into the different drawers of the filing cabinet, and the placing of the drawers. The arrangement is such as to locate the most frequently occurring letters in those positions calling for the least movement of the conveying mechanism, from the position of the drawer in the cabinet to the central position where the drawer is transferred to the operator's desk. The diagram also shows the numbers 1 to 9 pertaining, respectively, to the nine columns of drawers, the numbers running from left to right. The columns are divided into three levels numbered 1, 2 and 3, from top to bottom. These numbers will be used to identify the drawers in the further description, the numbers 1 to 9 pertaining to the radial positions being used as the units term of an identifying number and the numbers 1 to 3 pertaining to the three levels being used as the tens term of the identifying number. Thus the drawers will have the following identifying numbers, which also appear on them in Fig. 7:

In level 1, drawers 11, 12, 13 . . . 19.
In level 2, drawers 21, 22, 23 . . . 29.
In level 3, drawers 31, 32, 33 . . . 39.

*Keyboard and index mechanism*

The keyboard and index mechanism is shown in Figs. 15 to 19. There are two rows of first letter primary selection keys PK and a single row of five second letter primary selection keys SPK. In this same row is a "Return" key RT. There is also a row of secondary selection keys SKY, numbered 1 to 10. The four transversely extending banks of keys are of the same construction, with a few exceptions which will be noted; accordingly a description of the bottom key bank will apply generally to the others. The keys have stems 200 guided in a stationary frame comprising a top bar 201 and a bottom bar 202, tied together by end plates 203 and 204. The stem is broadened out below the top bar 201 and centrally slotted to receive a spring 199, which has a diameter greater than the thickness of the key stem and rests at its lower end upon the bottom bar 202, normally urging the key up to a position where its shoulders 205 abut against the top bar 201. Each key stem passes through a related slot 197 of a locking bar 198 slidably mounted in the end plates 203 and 204 and biased toward the right by a leaf spring 210 fastened at 211 to the end plate 204. The left edge of each key stem is formed with a slanting cam surface 206, a locking shoulder 207, and a second slanting cam surface 208, all coacting, at times, with the left end of the related slot 197. When a key is depressed its cam surface 206 will move the locking bar 198 to the left and the locking bar will snap over the shoulder 207 to lock the key down. If another key is depressed the first one will be released in well known manner. Mounted on the end plate 203 is a group of contacts 1a and 1b adapted to close by inherent spring force, but held open by the locking bar 198 in its normal position. Depression of any key in the bank will allow the contacts 1a and 1b to close momentarily, as will a second depression of the same key from locked down position, which cams the locking bar to the left by the surface 208. The second PK keybank has a group of contacts similar to the contacts 1a and 1b, which are identified in the wiring diagram as 2a and 2b (Figs. 20c and 20b). There are no similar contacts on the SPK, RT keybank, nor on the SKY keybank.

Mounted below each key stem of the PK keybanks, on an insulating panel 212, is a pair of contacts adapted to be bridged by a contact plate 213 on the bottom of the key stem. These pairs of contacts pertaining to the keys individually are identified by the reference numerals K1 to K24 (see Fig. 20a), the odd numbers, K1, K3, etc., being in the lower row. The SPK keys have similar pairs of contacts KSA, KSE, KSI, KSM, and KSR. The RT key has associated with it three pairs of contacts which cannot be seen in Fig. 16, but will be identified later in the description of the wiring diagram. The left edge of this key stem is straight and it therefore has no influence upon the locking bar 198, nor is it held down by the latter when depressed. The SKY keys have a single pair of contacts associated with each key and these are identified in Fig. 20b as SK1 to SK10.

In addition to the normal locking action of the locking bar 198, which can be released by depressing another key in the same bank, there is provided for each key bank an additional lock preventing any alteration of the setting of the keyboard from the time a new file-examining sequence has started until it has been completed. On the end plate 203 of each keybank a locking detent 215 is slidably guided in lugs 216. The detent is biased downward by a spring 217 and, when free, its end 215a engages in a hole 218 in the locking bar 198 and prevents it from moving. The lower end 215b of the detent cooperates as an armature with a solenoid 209, so that when the solenoid is excited, the detent is raised to the position shown in Fig. 17, releasing the locking bar 198.

Above the keyboard is an index drum 150 bearing lines of indicia, one of which appears in the window 151 of the casing 152. The particular line shown is the one which is brought to the window in response to depression of either the PK key G and the SPK key R-Z, or the PK key J. The correspondence identified by these keys includes the names beginning with GR and ending with GZ, and all the names beginning with J. As indicated by the indicia appearing in the window 151, this group of names is subdivided into ten parts, for the purpose of filing in the ten different compartments in the drawer pertaining to these keys (see Fig. 8). On the casing 152 are arrows 153 leading from the ten different sections of the line of indicia appearing in the window 151 to the respective SKY keys 1-10. Thus, the operator is apprised of the correct SKY key to be pressed for the purpose of the secondary selection, which will raise a single compartment of the drawer into position to be grasped and removed.

The index drum 150 is rotated by a motor IM. This motor, which runs constantly while the machine is in use, is connected by reducing gears 155 to a gear 156 pinned to a shaft 157 journaled in bearings 158 and 159, the bearings being secured by brackets 160 and 161 to the base 162 of the keyboard and index mechanism. The drum 150 is revolubly mounted on the shaft 157 and its hub 164 has fixed to it a toothed disk 165. Beside the latter there is revolubly mounted upon the hub 164 a second toothed disk 166, and on the opposite side of the disk 165 a ratchet wheel 167 is pinned to shaft 157. The toothed disk 165 has rockably mounted in it a small shaft 168, which has fixed to it at one side of the disk 165 a pawl 169, located in the same plane with the ratchet wheel 167. At the other end of the little shaft 168 is fixed an arm 170, this arm being located between the disks 165 and 166 and having at its extremity a pin 171 extending into a radial slot 172 in the disk 166 (see Fig. 19). A spring 173, anchored to a pin 174 on the disk 165 and connected to the pawl 169, biases the pawl toward the ratchet wheel 167. The relation of the parts is such that when the spring 173 has pulled the pawl 169 into engagement with the ratchet wheel 167, the arm 170 holds the disk 166 so that its teeth are slightly ahead of the teeth on disk 165, with reference to the counterclockwise rotation of the disks. A detent 175, pivoted at 176 to a bracket 177 secured by screws 177a to the main bracket 161 and biased toward the left by a spring (not shown) is held back clear of the disks 165 and 166 by a solenoid ST, while the index drum is turning to a new position, and is rocked in front of a particular pair of teeth on disks 165 and 166 identified with the selected line of the index drum, by deenergization of solenoid ST and energization of solenoid SP. The tooth of disk 166 strikes the detent 175 first and rocks arm 170, as disk 165 continues its rotation, throwing the pawl 169 out of engagement with the ratchet wheel 167. As the tooth of disk 165 is stopped by the detent 175, a rebound pawl 178 drops behind another pair of teeth of the disks 165 and 166. The rebound pawl is pivoted at 179 on a bracket 180, is biased toward effective position by a spring 181, and is retracted by a solenoid DT. The solenoid SP is deenergized when the index drum arrives at its new position. When the solenoids ST and DT are simultaneously energized by control means to be described presently, retracting their detents from the disks 165, 166 the disk 166 moves ahead as the spring 173 pulls the pawl 169 into engagement with the ratchet wheel 167. When so engaged, the ratchet wheel drives the disk 165, through the pawl 169, and thus rotates the index drum 150, which is fixed to the disk 165.

The selection of the position in which the index drum is to be stopped is accomplished by means of an index commutator IC shown in Fig. 18, and circuits to be described presently. The commutator comprises an insulating ring 185 holding a set of radial commutator segments 186. A brush 187 supported by a bracket 188 upon a block 189 fixed to the hub 164 travels over the commutator segment spots 186. Through circuits to be described presently, the contact of the brush 187 with a selected commutator segment 186 causes the energization of the detent solenoids ST, SP to be reversed, just before a particular tooth of the disk 165 corresponding to the selected line of the index drum reaches the detent 175.

· *Operation and circuit diagram*

The circuit diagram is divided into three parts. Fig. 20a shows the circuits controlled directly by the primary selection keys PK and SPK. Fig. 20b shows the index control circuits, the turn table control circuits, the carriage control circuits, and the circuits controlled by the secondary selection keys SKY. Fig. 20c shows the elevator control circuits, the program device circuits, and the four motor circuits.

The circuits will be explained by following through the operations constituting one file examining sequence. It will be assumed that the system stands in the condition with all drawers in normal storage position in the cabinet and the conveyor in the middle position, that is, with the elevator car at position 25. The keyboard locking solenoids 209 are all energized, contacts PO*b* having been closed at the end of the preceding sequence; thus the keyboard is released for setting. The operator wishes to examine correspondence under the name Gurney. He starts by pressing the PK key G and, noting that the G key bears an asterisk, indicating further primary subdivision; he presses the SPK key corresponding to the second letter of the name Gurney, in this case the R-Z key. The depression of the PK key momentarily closes the contacts 1*a* (see program device circuit, Fig. 20c). This completes the following circuit: From the line wire 220, connected to the line by switch 219 (Fig. 20a) through wires 221 and 222, contacts 1*a* (now closed), wire 223, PAO contact of the program distributor PRA, sliding contacts 224, 224*a* segment 225, wire 226, solenoid PM, wire 227, contacts PMA, wires 228 and 229 to the switch 219 and the other side of the line. The solenoid PM is energized and attracts its armature 230, which is rocked counter-clockwise against the pull of its spring 231 and drops its pawl 232 back one tooth on the distributor arm PRA. The armature 230 also opens the switch PMA, thus breaking the circuit of solenoid PM and allowing the armature 230 to rock clockwise, so that its pawl 232 throws the distributor arm PRA one step in counter-clockwise direction, bringing the contact 224 onto contact PA1. A second distributor arm PRB is advanced at the same time, its sliding contact 235 moving from the PRB contact PBO to contact PB1. The relay PO is deenergized and its PO*b* contacts open, deenergizing the solenoids 209. The detents 215 drop and lock the keyboard for the duration of the complete sequence which is to follow. The engagement of contact 235 with contact PB1 completes the following circuit: From the line wire 220, through wire 236, relay P1, wire 234, contact PB1, slide contact 235, segment 237, wire 238 to line wire 229.

The P1*a* contacts (see primary key circuits, Fig. 20a) are closed by the relay P1, completing the following circuits: Line wire 220, wire 240, contacts P1*a*, wires 241, 242, the contacts KSR (closed by SPK key R-Z), relay SR, wire 243 to line wire 229. The relay SR is a gang relay which closes all the contacts SR1-SR7. A circuit is also completed by contacts P1*a*, from line wire 220, wire 240, contacts P1*a*, wires 241 and 245, contacts K7 (closed by the PK key G), contacts SR3 (now closed), wire 246, relay F18, wire 247, relay E1, wire 248 to line wire 229. The relay E1 is one of a group of three relays, E1, E2, E3, governing the elevator control circuits. The relay F18 is one of twenty-seven relays arranged in three groups: F11-F19, F21-F29, and F31-F39. These relays govern the turn table control circuits and the index control circuits. The three groups are connected in series with the related relays E1, E2, and E3, respectively, by wires 247, 239, and 249.

Simultaneously with movements of the turntable and elevator, under control of circuits to be described presently, there is a quick setting of the index drum to a new position corresponding to the PK key G and the SPK key R-Z. This movement of the index drum is initiated by closure of contacts 1*b* (Fig. 20b), which completes a circuit from line wire 220 through normally closed contacts 6*a*, wire 255, contacts 1*b* (now closed), wire 256 and relay R3, to line wire 229. The 3*a* contacts of relay R3 close, completing a holding circuit for the relay. The 3*b* contacts close, completing a circuit from wire 255 through wire 257, solenoids ST and DT and relay R5, and wire 258, to wire 229. It will be recalled that the solenoid ST releasess the detent 175 from the clutch control disks of the index drum, while the solenoid DT retracts the rebound pawl 178. The pawl 169 drops in front of the first tooth of the ratchet wheel 167 and the index drum begins to rotate. The relay R5 is energized and closes its contacts 5*a*, thereby connecting the bus wire 259 to the line wire 220. The relay F18, energized in the present case, has closed its contacts F18*a* and set up the segment spot I18 of the index commutator IC. When the brush 187 reaches this segment spot, a circuit is completed through wire 260 and through solenoid SP and relay R6 in parallel, to the line wire 229. The relay R6 opens its contacts 6*a*, breaking the circuits of relay R3, R5, ST and DT. The detents 175 and 178 are thrown against the clutch control disks and release the driving pawl 169 in the manner previously described. The brush 187 moves, during this releasing operation, to the space between contacts I18 and I19. The index drum is stopped and locked by the detents 175 and 178 in the position which displays in the window 151 the line of indicia identifying the compartments of the drawer 18. The operator observes the notation GUA to GUZ, which embraces the name Gurney, above the arrow leading to the SKY key 5, and depresses that key. This releases any previously depressed key of the row and sets up a circuit for the secondary selection, to take place at a later stage in the program. The deenergization of relay R5 allows the 5*a* contacts to return to their normal open position.

Upon one of the frame posts 15 of the elevator there are mounted three pairs of normally open contacts L1, L2, and L3, and related operating levers 265 pivoted on brackets 266. The opposite end of each lever 265 has a pin 267 to engage a cam 268 on the car 17. Fig. 8 shows the cam 268 closing the contacts L2, the car being at the intermediate level, as in the example assumed. This is the condition shown in the diagram of the elevator control circuits in Fig. 20c. The energization of the relay P1 closes contacts P1*c*, completing the following circuit: From line wire 220 through wire 270, contacts P1*c* (now closed), wire 271, cam contact L2 (now closed), wire 272, contacts E1a of relay E1 (now energized), wire 273, pickup relay UP, wire 274 to line wire 229. The relay contacts UPa, UPb, UPc and UPd close, the latter completing a holding circuit from line wire 220, through wire 275, normally closed contacts 7c, wire 276, contacts UPd, wire 277, relay UPH to line wire 229. The closure of contacts UPc completes the circuit of the elevator motor EM, as follows: From line wire 220, wire 278, normally closed contacts 7b, wire 279, contacts UPc, through the motor circuits by way of normally closed contacts UPa and UPb, to the line wire 229. The elevator car moves up and contacts L2 open, deenergizing pickup winding UP. The elevator motor continues to run until the cam 268 closes contacts L1, at which time a circuit is completed as follows: From line wire 220, wire 270, contacts P1c (now closed), wire 271, contacts L1, wires 280 and 281, contacts E1c (now closed), wires 282 and 283, relay R7 to line wire 229. The relay R7 closes its contacts 7a and opens its contacts 7b and 7c, breaking the circuit of the elevator motor and the circuit of relay winding UPH. The circuit of the motor EM is further broken by the opening of contacts UPc. The elevator car now stands at level 1 and the operation of the elevator for this stage is complete.

Meanwhile, the turntable motor has been set in operation under control of circuits which are to cause the turntable to move from position 5 to position 8. The turntable control circuits shown in Fig. 20b include a commutator device TC (see also Fig. 10). This comprises an insulating segment 284 on which a set of stationary contacts TC1-TC9 are mounted in arcuate arrangement. With these contacts cooperate a series of contacts TCL, TCR, and TCS mounted on a rotary insulating member 285 geared to the shaft 59 by gears 53, 55, 286 and 287. The ratio of these gears is such as to make the rotary commutator plate 285 turn through somewhat less than 180° as the turntable completes a movement of 180°. The spacing of the contacts TCL, TCR, and TCS is the same as contacts TC1-TC9 and is such that there is a relative shift by one position as the turntable moves from one radial position to the next. There are eight contacts TCL connected together by a wire 288 and joined to a slip ring 289 by a wire 290. There are likewise eight contacts TCR connected together by a wire 291 and joined to a slip ring 292 by a wire 293. The single spot TCS is connected to a slip ring 294 by a wire 295. A brush 296 bearing on ring 289 is connected by a wire 297 to a relay CL; a brush 298 bearing on ring 292 is connected by a wire 299 to a relay CCL; and a brush 300 bearing on ring 294 is connected by a wire 301 to a relay R8. The three relays are connected by a wire 302 to wire 229.

The closure of contact P1b of the relay P1 completes a circuit from line wire 220 through wire 305, contact P1b, wire 306, bus wire 307, contact F18b of relay F18, wire 308, contact TC8 and the TCL spot in contact therewith, wires 288, 290, ring 289, brush 296 and wire 297, relay CL and wire 302 to line wire 229. The CLd contacts of relay CL close to complete a holding circuit for the relay through normally closed contacts 8c. The contacts CLc close to complete or prepare the circuit of turntable motor TM, which also depends upon the following preliminary operations relating to the turntable stop and lock devices: Closure of contacts P1d of the relay P1 completes a circuit from line wire 220, through wire 310, contacts P1d, wire 311, normally closed contacts 8d, wire 312, relay 119, wire 313 to line wire 229. The excitation of relay 119 closes contacts 116 (see turn table motor circuit, Fig. 20c) and opens contacts 116a. The closure of contacts 116 energizes relay 115, which, it will be remembered, operates release lever 111 to retract the stop levers 96 and 97 from the stop block 107. The opening of contacts 116a deenergizes relay 144, allowing its armature 125 to engage the locking lugs 124 of the stop arms 96 and 97, when they reach their retracted position. The rocking of the armature arm 140, acts through its pin 141 to close contacts 77 and to open contacts 118, breaking the circuit of solenoid 115. The movement of the stop levers 96 and 97 to the right carries the pins 136 and 137 in the same direction, so that the contacts 128 and 129 can close, to complete the following circuit through solenoid 127: From line wire 220, wire 315, contacts 128 and 129, wire 316, relay 127, wire 317 to the line wire 229. The locking lever 98 is released from the stop block 107 by the attraction of its armature 138 and the contact 76 is closed, completing the circuit of turntable motor TM as follows: From line wire 220, wire 318, normally closed contacts 8b, wire 319, relay contacts CLc (now closed), the motor armature circuit and the motor field winding circuit through normally closed contacts CLa and CLb, wire 320, contacts 76 and 77 (now closed) and wire 321 to line wire 229. The turn table motor revolves the turntable in clockwise direction from position 5 toward position 8, while the single spot TCS moves in the same direction over TC contacts 6, 7, and 8 in succession. Upon arrival of the single spot TCS at the live contact TC8, a circuit is completed from this contact through wire 295, ring 294, brush 300, wire 301, relay R8 and wire 302 to line wire 229. The contacts 8a are closed and the contacts 8b, 8c and 8d are opened. The opening of contacts 8b stops the turntable motor, the opening of contacts 8c breaks the holding circuit of relay CL, and the opening of contacts 8d breaks the circuit of relay 119, which allows contacts 116 to open and contacts 116a to close. Relay 144 is energized and its armature releases the stop arms 96 and 97. This occurs just before the turntable reaches the new index position, so that the stop arms are ready to stop it by abutment with the related block 107. When the turntable has come to rest the contacts 128 and 129 are both open and the locking arm 98 is released to engage the related block 107. The elevator car now stands in front of the file drawer 18. The closure of contacts 7a and 8a, previously mentioned, completes a circuit containing a relay R9. The contacts 9a thereof close, completing a circuit through PRA contact, PA1 and energizing the solenoid PM to step the program distributor arms forward to the PA2, PB2 contacts, to initiate the carriage movements which are to transfer the selected drawer, No. 18, from the file cabinet to the elevator car.

The carriage control circuits which are now to be described include a number of contacts operated by the carriage in its different positions, herein referred to as "carriage contacts." There are three sets of carriage contacts, namely: CA1, normally open, and CA2, normally closed, these being reversed, as the carriage moves into its left end position at the desk; CB1, normally open, and CB2, CB3, normally closed, these being reversed as the carriage arrives in its central position on the elevator car; CC1, normally open, CC2, normally closed, and CC3, normally open, these contacts being reversed upon arrival of the carriage at the right end of its travel. The contacts CA1 and CA2 are mounted on a flange 93 of the frame plate 89 and are actuated by a lever 185 pivoted at 186 on the flange 93. The right end of the lever bears a pin 185a extending through a slot 187 in the flange 93, in position to be lifted by a boss 188 on the side bar 45 of the carriage 42. The contacts CB1, CB2, CB3 and CC1, CC2, CC3 are mounted on a side flange 40a of the car 40 and are operated by levers 185 pivoted at 189 and 190, respectively, on the flange 40a.

The program relay P2 is energized by the engagement of sliding contact 235 with the spot PB2 and closes its contacts P2a, P2b and P2c in the carriage control circuits, completing the following circuit: From line wire 220, through wire 322, contacts P2a, wire 323, carriage contacts CB1 (now closed), contacts P2c, normally closed contacts 12d, wire 327, pickup winding 11P of relay R11, wires 328 and 329 to wire 229. Relay contacts 11a close, completing a parallel holding circuit from wire 323 through wire 330, normally closed carriage contacts CC2, wire 331, contacts 11a, winding 11H of relay R11, and wires 328, 329 to line wire 229. Contacts 11b close, completing a circuit through the armature of the carriage motor CM and through the field winding of motor CM by way of the contacts 12b and 12c, normally held in the position shown. The carriage motor starts to rotate in the direction to drive the carriage toward the file cabinet. As the carriage moves out of normal position on the elevator car, contacts CB1, CB2, and CB3 reverse. The opening of contacts CB1 breaks the circuit of pickup winding 11P, the closure of contacts CB2 is without effect at this time, while the closure of contacts CB3 completes the following circuit: From line wire 220, through wire 333, contacts P2b (now closed), wire 334, carriage contacts CB3, wire 335, pickup winding 17P of relay R17, wires 328 and 329, to line wire 229. Contacts 17a close to complete the following holding circuit for relay R17. From normally closed carriage contacts CC2, through wire 336, contacts 11c (now closed), wire 337, contacts 17a, winding 17H of relay R17, wires 328 and 329 to line wire 229. A parallel circuit is completed by closure of contacts 17b, through solenoid 83 (see also Fig. 8). The turned up end of lever 79 is thrown up into the path of detent flange 75a and trips the detent as the carriage passes, releasing hook 70 to operative position. As the movement of the carriage into the cabinet is completed and the hook 70 engaged with the pin 72, the carriage contacts CC1 are closed and the carriage contacts CC2 are opened. The opening of contacts CC2 deenergizes the holding circuits of the relays R11 and R17, and the circuit of solenoid 83, retiring arm 79. The contacts 11b open, breaking the circuit of the carriage motor CM, and the contacts 11c return to their normal open condition. The closure of the carriage contacts CC1 completes a circuit from wire 323, through wire 340, carriage contacts CA2 (normally closed), wire 341, carriage contacts CC1, wire 342, pickup coil 12P of relay R12, wires 328 and 329 to line wire 229. The contacts 12a close to complete a holding circuit from carriage contacts CA2, through wire 343, normally closed contacts 14a, contacts 12a, and holding coil 12H of relay R12. The contacts 12b and 12c transfer and contacts 12f close, to start rotation of the motor CM in the reverse direction. The carriage moves to the left, pulling with it the file drawer. The motion continues until the boss 188 closes the carriage switch CB1, completing a circuit through wire 346, contacts 12e (now closed), normally closed contacts P4d, relay R14, wires 328, 329 to the line wire 229. The contacts 14a open, breaking the holding circuit of relay R12. The contacts of relay R12 return to normal position, stopping the carriage motor CM. The relay contacts 14b close, completing a circuit through the program contact PA2 to the solenoid PM and stepping the program distributor arms forward to the contacts PA3 and PB3. The relay P3 is energized and closes contacts P3a (Fig. 20a). This completes a direct circuit through the elevator relay E2 which closes its contacts E2a, completing the following circuit: From line wire 220, through wire 270, contacts P3c (now closed), wire 271, car contacts L1, wire 280, contacts E2a, wire 349, pickup relay DN, wire 350, to line 229.

The contacts DNa, DNb and DNc close, completing a circuit through the elevator motor EM to operate the same in the down direction. A holding circuit is completed by closure of relay contacts DNd, from line wire 220, through wire 275, normally closed contacts 7c, wire 276, contacts DNd, wire 351, relay winding DNH, wire 352, to line wire 229. As the elevator car starts down, the cam contacts L1 open, deenergizing pickup winding DN. Upon arrival of the car at the middle level, the boss 268 closes cam contacts L2, completing the following circuit: From line wire 220, by way of wire 270, contacts P3c, wire 271, cam contacts L2, wires 272 and 303, contacts E2c (now closed), wire 283, relay R7, to line 229. The relay contacts 7a close and the relay contacts 7b and 7c open. The opening of contacts 7b stops the elevator motor and the opening of contacts 7c breaks the holding circuit of relay winding DNH.

Meanwhile, the contacts P3d of relay P3 close, energizing the relay 119 and preparing the circuit of the turntable motor, while releasing the turntable locking devices in the manner previously described. The relay contacts P3b close completing a circuit through wires 353 and 354 to the contact TC5. As this contact is now engaged by one of the TCR contacts, the circuit continues through wires 291, 293, ring 292, brush 298, wire 299, relay CCL and wire 302, to line wire 229. The relay contacts CCLa, CCLb and CCLc close, completing the circuit of the turntable motor TM to start the rotation thereof in counterclockwise direction. Relay contacts CCLd are also closed to complete a holding circuit for the relay CCL. The single spot TCS moves counterclockwise from contact TC8 toward live contact TC5. When it engages the latter, a circuit is completed through wire 295, ring 294, brush 300, wire 301, relay R8, wire 302, to line wire 229. The circuit of the turntable motor is broken by the opening of relay contacts 8b. The holding circuit of relay CCL is interrupted by the opening of contacts 8c, and the relay 119 is deenergized by the opening of relay contacts 8d, causing the stopping and locking of the turntable to proceed as previously described.

The relay contacts 8a close and relay contacts 7a being also closed, relay R9 is energized. Current travels through relay contacts 9b and contact spot PA3 to solenoid PM, to step the program distributor arms forward to contacts PA4 and PB4. Relay P4 is energized. Its contacts P4a and P4b close to complete a circuit as follows: From line wire 220, through wire 322, contacts P4a, carriage contacts CB1, wire 346, contacts P4b, wire 358, pickup winding 12P of relay R12 and wires 328, 329 to line wire 229. The relay contacts 12a close to complete a holding circuit for the relay R12 in the manner previously described. While the carriage contacts CB1 are closed at this time, the closure of relay contacts 12e does not energize the relay R14, because the contacts P4d of relay P4 are now open. The contacts 12b and 12c transfer from their normal position and the contacts 12f close, to start the carriage motor once more in the direction to move the carriage to the left. The movement continues until the carriage reaches its left end position upon the shelf 18, at which time the carriage contacts CA2 are opened, breaking the holding circuit of relay R12. The relay is deenergized and the contacts 12f open to stop the carriage motor, the contacts 12b and 12c transferring to their normal position.

Upon arrival of the carriage at its left end position, the carriage contacts CA1 are closed, completing the following circuit for operating the secondary selecting means: From line wire 220, through wires 322 and 359, normally closed contacts 13c, carriage contacts CA1, wire 361, return key contacts RT2 normally closed, wire 362, bus wire 363, contacts SK5 closed by the SKY key 5, solenoid CP5, bus wire 365 and wire 366, to line wire 229. The energization of solenoid CP5 lifts the compartment containing the correspondence indexed under the letters GUA to GUZ. The operator removes the compartment and examines the Gurney correspondence.

When the examination is completed, the operator returns the compartment to its position in the drawer and presses the RT key. The contacts RT1 close, transmitting current through contacts PA4 to the program stepping relay PM and advancing the distributor arms of the program device to contacts PA5 and PB5. The contacts RT2 are opened, deenergizing the solenoid CP5 and allowing the compartment to drop to normal position in the drawer. The contacts RT3 close, completing a circuit from carriage contacts CA1 now closed, through contacts RT3, wire 368, and pickup winding 13P of relay R13 to wires 328, 329, 229.

The energization of relay R13 causes its contacts 13a to close, completing a holding circuit from line wire 220, through wires 322, 369, normally closed contacts 16b, wire 370, contacts 13a, wire 371, and holding coil 13H of relay R13. At the same time relay contacts 13c are opened to prevent reenergization of the secondary selection solenoid upon return of the RT key to normal position. The relay contacts 13b close, completing the circuit of the carriage motor CM which rotates in the direction to move the carriage to the right, the contacts 12b and 12c being in normal position. During this movement of the carriage, the drawer is pushed forward by the arcuate portion 67 of the hook 70, the hook having been thrown to retracted position and caught by the detent 75, upon arrival of the carriage at its left end position. As the carriage moves out of its left end position, the carriage contacts CA1 and CA2 return to their normal positions. The movement of the carriage to the right continues until it has arrived at its normal position on the elevator car, at which time the carriage contacts CB1 are closed.

Meanwhile, the energization of program relay P5 has set up the following circuit which is completed by the closure of carriage contacts CB1: From line wire 220, through wire 322, contacts P5a, wire 323, carriage contacts CB1, wires 346 and 374, relay contacts P5d, relay R16, and wires 328, 329 and 229. Relay contacts 16b open, to break the holding circuit of relay R13. Relay contacts 16a close, sending current through the PA5 spot of the program device to operate the feed magnet PM and advance the distributor arms to the contacts PA6 and PB6. The program relay P6 is energized and closes its contacts P6a (Fig. 20a). This reestablishes the circuits through the primary keyboard and starts an operation of the elevator motor and the turntable motor in the same way as during the first stage of the sequence. In this case, it is the contacts P6c of the elevator control circuits which are closed and the contacts P6b of the turntable control circuits. When the elevator returns to level 1, it is stopped by the energization of relay R7, the contacts 7a of which again close. When the turntable arrives at radial position 8, the relay R8 is energized and the contacts 8a close. This completes the circuit of relay R9 and its contacts 9c are closed, sending current through the PA6 spot of the program device to the feed magnet PM.

The distributor arms of the program device are moved to contacts PA7 and PB7 and the program relay P7 is energized. The relay contacts P7a close, completing the following circuit: From line wire 220, through wire 322, contacts P7a, wire 323, carriage contacts CB1, relay contacts P7b, normally closed contacts 12d, wire 327 to the pickup winding 11P of relay R11, thence through wires 328 and 329 to line wire 229. The relay contacts 11a close, completing a holding circuit for the relay R11. The relay contacts 11b close, completing the circuit of carriage motor CM, which rotates in the direction to drive the carriage to the right, the contacts 12b and 12c being in their normal position. When the carriage starts to move, the carriage contacts CB1 open and break the circuit to pickup winding 11P. The motion of the carriage continues until the drawer is transferred to the file cabinet, at which time the carriage contacts CC2 open, breaking the circuit of the holding winding 11H of relay R11.

The carriage motor is stopped by the opening of relay contacts 11b. The carriage contacts CC1 close, to energize the pickup winding 12P of relay R12. The holding circuit of this relay is reestablished by closure of contacts 12a. The contacts 12b and 12c transfer and contacts 12f close, to complete the circuit of the carriage motor which rotates in the direction to move the carriage to the left. The hook 70 having been released previously, the carriage returns to the elevator car without drawer. Upon arrival of the carriage at its normal position on the elevator car, the carriage contacts CB1 are closed, completing a circuit through relay contacts 12e and normally closed contacts P4d to relay R14. The energization of relay R14 opens contacts 14a and breaks the holding circuit of relay R12. The relay contacts 12f open, to stop the carriage motor.

Meanwhile, the contacts P7d of program relay P7, which were closed when the relay was energized, set up a circuit, which was completed by closure of the carriage contacts CC3, upon arrival of the carriage at the right end of its travel. The circuit then established is an obvious one through relay R15, whose contacts 15a close to complete a parallel holding circuit for the relay, through normally closed contacts P0a. Relay contacts 15b close, completing a circuit from line 220, through wire 380, contacts 15b, wire 381, normally closed carriage contacts CB2, wire 382, solenoid PMR, and wire 383, to line 229. The solenoid PMR attracts its armature 376, which rocks the pawl 232 out of engagement with the teeth of the distributor arm PRA. The distributor arms return to starting position under the influence of a spring (not shown). When the sliding contact 235 engages the contact PBO, the program relay PO is energized. Its contacts POa are opened to break the holding circuit of relay R15, while its contacts POb are closed to energize the keyboard lock releasing solenoids 209. When the carriage returns to its normal position on the elevator car, the carriage contacts CB2 open, breaking the circuit of solenoid PMR and restoring the pawl 232 to its normal position in contact with the teeth of distributor arm PRA.

This completes the sequence of operations and leaves the system in condition to start a new sequence by the depression of appropriate keys of the keyboard.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a filing system associated with an operator's station, a cabinet containing a plurality of columns of drawers, the drawers being movable horizontally in vertical planes intersecting at a common center, conveying means comprising an elevator frame mounted to pivot about said common center and a car movable vertically on said frame, said car being proximate to the operator's station in one position and being movable by its vertical travel on said elevator frame and by the turning of said elevator frame, to various positions, each proximate to a different one of said drawers, separate motor drives to turn said elevator frame about its pivot and to raise and lower said elevator car, respectively, a keyboard at the operator's station to identify a single one of said drawers, and separate control means for said motor drives both controlled by each of said identifying keys, to start said drives approximately simultaneously and to stop said drives individually, when the required horizontal and vertical movements of said car have been executed.

2. In a filing system, a cabinet having a plurality of columns of drawers, conveying means comprising a support and means mounting the same for simultaneous horizontal and vertical movements to reach various positions proximate, respectively, to the different drawers of said cabinet; separate motor drives adapted to impart horizontal and vertical movements, respectively, to said support, control means comprising a keyboard with a set of drawer identifying keys, and separate control means for said motor drives both controlled by each of said identifying keys, to start said drives approximately simultaneously and to stop said drives individually, when the required horizontal and vertical movements of said support have been executed.

3. In a filing system associated with an operator's station, for filing material identified by a first letter, or by first and second letters, storage means for holding a number of units of material in different individual positions corresponding, respectively, to the identifying letters of the units of the material, conveying means adapted to convey a unit of material from any one of said positions to the operator's station, control means for said conveying means comprising a keyboard with first letter and second letter keys, a number of identifying devices corresponding, respectively, to the different units and control devices operated by said keys to select said identifying devices individually for operation, the control devices operated by said second letter keys acting jointly with at least some of the control devices operated by said first letter keys, to select identifying devices pertaining to units with corresponding identifying letters.

4. In a filing system associated with an operator's station, storage means comprising a number of drawers each containing a plurality of compartments, and a cabinet to hold said drawers in individual positions; means for transporting a selected one of said drawers from its storage position in said cabinet to the operator's station, said transporting means comprising a conveyor movable to positions proximate to the several storage positions of said drawers, a keyboard at the operator's station, means operated thereby to control the movement of said conveyor to a selected one of said positions, an index movable to selected positions to display in each position notations of the materials in the different compartments of a drawer corresponding to such position, means whereby said index is set in motion simultaneously with the start of movement of said conveyor and controlled in its movement by means operated by the same key controlling the movement of said conveyor; and secondary selection means including a set of keys of said keyboard corresponding to the subclassification indicated by said index, and means operating automatically under control of a key in said last set, upon arrival of a drawer at the operator's station, to project a particular compartment of the drawer.

5. A filing system as described in claim 4, wherein said secondary selection means comprises a set of lifting devices aligned with the respective compartments of a drawer at the operator's station, and means for selectively actuating said lifting devices under control of a key in said last set.

6. In a filing system associated with an operator's station, storage means to hold a number of units of material in different individual positions; conveying means movable to various positions, one proximate to the operator's station, and others proximate to the individual storage positions of said unit; means for transferring a unit of the material between its storage position and said conveying means; driving means for said conveying means; driving means for said transferring means; control means for said first driving means comprising a keyboard with keys identifying the individual units, and elements operated by said conveying means, the effect of said control means being jointly determined by said keys and said elements to cause a movement of said conveying means from any of its possible positions toward the position proximate to the unit identified by the particular key operated and to terminate the movement at said last position; control means for said second driving means responsive to the arrival of said conveying means at the identified unit, to start said second driving means; and control means operated in response to the transfer of the unit to said conveying means, to initiate a movement of said conveying means to bring the unit to the position proximate to the operator's station.

7. In a filing system associated with an operator's station, storage means for holding a number of units of material in different individual positions; conveying means adapted to convey a unit of material from any one of said positions to the operator's station; control means for said conveying means comprising a keyboard with first letter and second letter keys; a plurality of circuits pertaining, respectively, to the different units, each circuit including a device adapted to be energized when the circuit is completed, to identify the related unit; circuit closing devices for each of said keys included in said circuits, the circuit closing devices pertaining to said second letter keys being in series relation to certain of the circuit closing devices pertaining to said first letter keys, the completion of a circuit containing such series related circuit closing devices requiring the operation of both a first letter key and a second letter key; means controlled by the selected identifying device for causing said conveying means to execute a movement to a position proximate to the unit corresponding to the selected identifying device; means responsive to the arrival of the conveying means in said position for transferring said unit to said conveying means; and control means including means responsive to the arrival of said unit on said conveying means for causing the latter to convey said unit to a position proximate to the operator's station.

THOMAS J. WATSON.
BURDETTE H. PHILLIPS.